United States Patent [19]

Sekii

[11] Patent Number: 5,295,023

[45] Date of Patent: Mar. 15, 1994

[54] DIGITAL SIGNAL RECORDING APPARATUS FOR ANALOG/DIGITAL INPUT

[75] Inventor: Yasuaki Sekii, Tokyo, Japan

[73] Assignee: Sony Corporation, Tokyo, Japan

[21] Appl. No.: 842,510

[22] Filed: Feb. 27, 1992

[30] Foreign Application Priority Data

Feb. 28, 1991 [JP] Japan ............................ 3-58152
Feb. 28, 1991 [JP] Japan ............................ 3-58154

[51] Int. Cl.$^5$ ............................................ G11B 5/86
[52] U.S. Cl. ................................... 360/32; 360/61
[58] Field of Search ................... 360/32, 15, 61, 46; 369/2, 3, 4, 5, 84

[56] References Cited

U.S. PATENT DOCUMENTS 5,130,864  7/1992  Shimada ............................. 360/32
5,159,502  10/1992  Ejima et al. ....................... 360/32

FOREIGN PATENT DOCUMENTS 297242   4/1988  European Pat. Off. .
286437   8/1988  European Pat. Off. .
328141  10/1989  European Pat. Off. .
422849   5/1990  European Pat. Off. .
416663  10/1990  European Pat. Off. .
3806414  7/1989  Fed. Rep. of Germany .

OTHER PUBLICATIONS

Patent Abstracts of Japan, vol. 14, No. 366, Aug. 8, 1990 (Hosaka).

Primary Examiner—Robert J. Pascal
Assistant Examiner—Tan Dinh
Attorney, Agent, or Firm—Lewis H. Eslinger; Jay H. Maioli

[57] ABSTRACT

A digital signal recording apparatus directly receives analog signals and digital signals, the directly received digital signals or the analog signals converted to digital form being selectively recorded on a recording medium. The digital signals for recording are selected on the basis of copy-enable/disenable assigning signals which are contained in the directly received digital signals.

4 Claims, 5 Drawing Sheets

DIGITAL SIGNAL RECORDING APPARATUS FOR ANALOG/DIGITAL INPUT

BACKGROUND OF THE INVENTION

This invention relates to a digital signal recording apparatus for analog/digital input, and more particularly is suitable for use with a digital recording/reproducing apparatus.

In a conventional digital recording/reproducing apparatus, e.g. a digital audio tape recorder (DAT), digital audio signals to be inputted are digital-recorded on a magnetic tape. In addition, there are two series of signal input terminals so that analog audio signals to be inputted are converted into digital audio signals and digital-recorded on the magnetic tape.

Besides, in the DAT, there are two series of signal output terminals so that the digital audio signals obtained by reproducing from the magnetic tape are outputted directly and the digital audio signals are converted into analog audio signals and outputted.

In particular, the digital audio signals are digital-recorded on the magnetic tape and simultaneously, after being reproduced therefrom, outputted as digital audio signals. In this case, there is no decline in sound quality of the audio signals in terms of utilization. Ideally, the audio signals can be recorded and reproduced.

Where the audio signals are ideally recorded and reproduced, it follows that transcriptional recording, i.e., so-called dubbing, can be repeated any number of times. This conduces to a possibility in which the author's copyright is infringed. Hence, there is a serial copy management system (SCMS) adapted to effect generation management of copies of the digital audio signals as a method of managing and restricting the infringement.

To be specific, 2-bit digital copy authorized information is contained in the subcodes added to the digital audio signal inputted to the DAT from the digital signal source such as the DAT, the compact disc unit and the satellite broadcasting transmitter/receiver. As a matter of fact, 2 bits of the digital copy authorized information serve to specify a status of whether the digital copy is authorized over any generations or only one generation or is inhibited.

Hence, in the DAT, the digital copy authorized information of the subcodes added to the digital audio signals to be inputted specify the extent to which the copying is authorized over any generations. Then, the digital audio signals are digital-recorded on the magnetic tape and at the same time recorded as subcode data by setting the status in which the digital copy is authorized over any generations as new digital copy authorized information.

When the digital copy authorized information added to the digital audio signals to be inputted specifies the status in which the digital copy is authorized over only one generation, the digital audio signals are digital-recorded on the magnetic tape and at the same time recorded as subcode data by setting the status in which the digital copy is inhibited as new digital copy authorized information.

Further, when the digital copy authorized information added to the digital audio signals to be inputted specify the status in which the digital copy is inhibited, the digital record of the digital audio signals is immediately stopped.

Incidentally, as illustrated in FIG. 1, there has been proposed a so-called DAT system 1 structured by combining the DAT described above with a module consisting of sources of various audio signals. For instance, in this case, the system incorporates a digital signal reproducing apparatus (DAT) 2, a compact disc unit (CD) 3 and a satellite broadcasting transmitter/receiver (BS) 4 as sources of the audio signals.

Output digital audio signals D1, D2 and D3 and output analog audio signals A1, A2 and A3 are transmitted from the digital signal reproducing apparatus (DAT) 2, the compact disc unit 3 and the satellite broadcasting transmitter/receiver 4 and then inputted to an amplifier/selector unit 5.

As a matter of fact, the amplifier/selector unit 5 selects any of the output digital audio signals D1, D2 and D3 and the output analog audio signals A1, A2 and A3 which are inputted from the digital signal reproducing apparatus (DAT) 2, the compact disc unit 3 or the satellite broadcasting transmitter/receiver 4 in accordance with an operation of the user. The amplifier/selector unit 5 transmits the selected signal as an input digital audio signal DIN and an input analog audio signal AIN of a digital signal recording apparatus (DAT) 6.

If it is thereby known that the digital copy is authorized by the digital copy authorized information contained in the output digital audio signal D1, D2 or D3 transmitted from the digital signal reproducing apparatus (DAT) 2, the compact disc unit 3 or the satellite broadcasting transmitter/receiver 4, the user may make a selection to record the input digital audio signal DIN by operating the digital signal recording apparatus DAT 6.

As a result of this, the output digital audio signal D1, D2 or D3 transmitted from the digital signal reproducing apparatus (DAT) 2, the compact disc unit 3 or the satellite broadcasting transmitter/receiver 4 is selected as an input digital audio signal DIN. The output digital audio signal D1, D2 or D3 is digital-recorded on the magnetic tape being composed of a signal recording medium in this manner.

Besides, if it is known that the digital copy is inhibited by the digital copy information contained in the output digital audio signal D1, D2 or D3, the user may make a selection to record the input analog audio signal DIN by operating the digital signal recording apparatus (DAT) 6.

As a consequence of this, the output analog audio signal A1, A2 or A3 transmitted from the digital signal reproducing apparatus (DAT) 2, the compact disc unit 3 or the satellite broadcasting transmitter/receiver 4 is selected as an input digital audio signal AIN. The output analog audio signal A1, A2 or A3 is digital-recorded on the magnetic tape in this way.

In the thus constructed DAT system 1, however, the user operates the digital signal recording apparatus (DAT) 6 and makes a selection to record the input digital audio signal DIN or the input analog audio signal AIN. Hence, when recording a source of such audio signals that a digital copy authorized signal portion is mixed with a digital copy inhibited signal portion, a variety of problems arise.

More specifically, as explained earlier, when recording, on the digital signal recording apparatus (DAT) 6, the output digital audio signals D1, D2 and D3 or the output analog audio signals A1, A2 and A3 which are transmitted from the digital signal reproducing apparatus (DAT) 2, the compact disc unit 3 and the satellite broadcasting transmitter/receiver 4 as the input digital audio signals DIN or the input analog audio signals AIN, the input digital audio signals DIN are recorded by operating the digital signal recording apparatus (DAT) 6. Produced in this case is a problem in which the digital copy authorized signal portion can be recorded, while recording stops at the digital copy inhibited signal portion and thereby becomes impossible.

In contrast with this, if the selection is made to record the input analog audio signal AIN by operating the digital signal recording apparatus (DAT) 6, the digital copy authorized signal portion is also recorded as the input analog audio signal AIN. This results in such a problem that the audio signal a sound quality of which declines is recorded, correspondingly.

To obviate such problems, the selection is made to, it is considered, record the input digital audio signals DIN or the input analog audio signals AIN by the user's operating the digital signal recording apparatus (DAT) 6 in accordance with the digital copy authorized and inhibited signal portions.

If done in this manner, however, and when the digital copy authorized signal portion is frequently replaced with the digital copy inhibited signal portion, troublesome switchover operations are needed correspondingly. This leads to such a problem that the usability of the user is deteriorated. Eventually, this is insufficient as a solution.

By the way, in such a DAT, there has been proposed a so-called double DAT deck 11, as in the same way with a double deck system of conventional audio tape recorders using cassette tapes, the deck 11, as illustrated in FIG. 2, being capable of dubbing from a digital signal reproducing system DAT 11A to a digital signal recording system DAT 11B. In the dubbing system, the dubbing of the signals is performed between the digital signal reproducing means and the digital signal recording means.

In the digital signal reproducing system DAT 11A of this double DAT deck 11, a magnetic tape is reproduction-driven by a mechanical-deck-structured tape driving unit 12A having a rotary head. A regenerative signal SPB obtained thereby is inputted to a digital signal processing circuit 13A.

The digital signal processing circuit 13A executes predetermined signal processing of the regenerative signal SPB. A regenerative digital audio signal DPB obtained as a result of this is transmitted to outside via a digital output terminal 14A and at the same time inputted to a digital/analog converting circuit 15A.

The digital/analog converting circuit 15A converts the regenerative digital audio signal DPB into an analog signal. This analog signal is, after being filtered by a low-pass filter 16A, transmitted as a regenerative analog audio signal APB via an analog output terminal 14B.

The regenerative digital audio signal DPB obtained in the digital signal reproducing system DAT 11A is inputted to a first input terminal a of a digital input switching circuit 17A of a dubbing switching circuit 17 provided in the digital signal recording system DAT 11B. The regenerative analog audio signal APB is inputted to a first input terminal a of the analog input switching circuit 17B of the dubbing switching circuit 17.

An input digital audio signal DIN and an input analog audio signal AIN which are provided from outside are supplied via a digital input terminal 18A and an analog input terminal 18B to second input terminals b of the digital input switching circuit 17A and the analog input switching circuit 17B.

In fact, the digital input switching circuit 17A and the analog input switching circuit 17B of this dubbing switching circuit 17 interlock with each other by an manual operation of the user. These circuits 7A, 7B serve to specify either dubbing the signal obtained from the digital signal reproducing system 11A or recording of the audio signals inputted from outside.

Either the regenerative digital audio signal DPB or the input digital audio signal DIN is selected from an output terminal of the digital input switching circuit 17A. The selected signal is inputted as a recording digital audio signal DREC to the first input terminal a of a digital/analog selection circuit 19.

Either the regenerative analog audio signal APB or the input analog audio signal AIN is selected from an output terminal of the analog input switching circuit 17B and, after undergoes filtering means of a low-pass filter 16B, inputted as a recording analog audio signal AREC to the analog/digital converting circuit 15B.

The analog/digital converting circuit 15B converts the recording analog audio signal AREC into a digital signal. A second recording digital audio signal DREC1 obtained as a consequence of this is inputted to the second input terminal b of the digital/analog selection circuit 19.

This digital/analog selection circuit 19 is capable of selecting whether an input path of a source for recording is associated with the digital audio signal DREC or the analog audio signal AREC corresponding to the manual operation of the user. A third recording digital audio signal DREC2 obtained at the output terminal thereof is inputted to a digital signal processing circuit 13B.

The digital signal processing circuit 13B executes predetermined digital signal processing of the third recording digital audio signal DREC2. A recording signal SREC obtained as a result of this is supplied to a tape driving unit 12B having a rotary head, thus digital-recording a desired audio signal on the magnetic tape.

In the double DAT deck 11, the user switches over the digital input switching circuit 17 and the analog input switching circuit 17B of the dubbing switching circuit 17 to the first input terminal a in this manner. At the same time, if it is known beforehand that the digital copy is authorized, the digital/analog selection circuit 19 is also switched over to the first input terminal a. A content reproduced by the digital signal reproducing system DAT 11A can be thereby digital-recorded by the digital signal recording system DAT 11B through a digital audio signal path LD.

If it is previously known that the digital copy is inhibited, the digital/analog selection circuit 19 is switched over to a second input terminal b. The content reproduced in the digital signal reproducing system DAT 11A can be thereby digital-recorded by the digital signal recording system DAT 11B through an analog audio signal path LA.

In the thus constructed double DAT deck 11, however, there arises a variety of problems when dubbing the magnetic tape in which a digital copy authorized signal portion is mixed with a digital copy inhibited signal portion, because the user is able to change over the dubbing path.

Namely, when dubbing the above-mentioned magnetic tape, the digital audio signal path LD is specified by selecting the first input terminal a of the digital/analog selection circuit 19. In this case, dubbing is allowed to take place at the digital copy authorized signal portion. At the digital copy inhibited signal portion, recording stops with the result that dubbing becomes impossible.

Contrastingly, the analog audio signal path LA is specified by selecting the second input terminal b of the digital/analog selection circuit 19. In this case, dubbing is effected also at the digital copy authorized signal portion via the analog audio signal path LA, and a sound quality declines correspondingly.

To obviate such problems, it is considered that the user may switch over the first input terminal a and the second input terminal b of the digital/analog selection circuit 19 by manual operation in accordance with the digital copy authorized and inhibited signal portions. If done in this way, the digital copy authorized and inhibited signal portions are frequently replaced with each other. In such a case, troublesome switching operations are required. The usability of the apparatus is deteriorated. This is insufficient as a solution.

This type of double DAT deck 11 includes the digital/analog converting circuit 15A and the analog/digital converting circuit 15B for analog signal recording and reproducing. The circuits respectively have low-pass filters 16A, 16B. On the occasion of dubbing via the analog audio signal path LA, the signals undergo filtering by the two low-pass filters 16A and 16B, and hence there is a possibility of a decline in sound quality.

SUMMARY OF THE INVENTION

In view of the foregoing, an object of this invention is to provide a digital signal recording apparatus for analog/digital input in which it is possible to remarkably improve the usability of the apparatus by solving the problems inherent in the prior arts at one time.

The foregoing object and other objects of the invention have been achieved by the provision of a digital signal recording apparatus for digital-recording digital information or analog information to be inputted on a second medium, comprising: a recorded information selection means for selecting digital information to be inputted or digital information which is analog/digital converted into from analog information to be inputted; and a record controlling means for controlling said recorded information selection means in accordance with status specified with a transcribing record information detected from digital information including the same; the input signals being selected and recorded without that user is aware of whether the transcription of the digital information is authorized or not: and a digital signal recording apparatus comprising: digital information reproducing means for outputting output digital information and analog information by drive-controlling a first record medium on which digital recording is effected and reproduced therefrom; digital information recording means for drive-controlling a second record medium and digital-recording analog information to be inputted or digital information, a digital information transcriptional path for inputting, when transcription-recording the information recorded on the first record medium on the second record medium, the output digital information outputted from the digital information reproducing means to the digital information recording means; an analog information transcriptional path LA for inputting the output analog information outputted from the digital information reproducing means to the digital information recording means; and transcriptional control means for reproducing an information recorded the first record medium, and when transcriptional record contained in the digital information are obtained, selecting the digital information transcriptional path or the analog information transcriptional path in accordance with a detection result thereof.

In the transcriptional path control means, when the transcription of the digital information is authorized, the digital information transcriptional path is selected based on the transcriptional information. When the transcription of the digital information is inhibited, the analog information transcriptional path is selected. The information recorded on the first record medium can be thereby transcription-recorded on the second record medium by selecting automatically the best path corresponding to the transcriptional record information.

The nature, principle and utility of the invention will become more apparent from the following detailed description when read in conjunction with the accompanying drawings in which like parts are designated by like reference numerals or characters.

DETAILED DESCRIPTION OF THE INVENTION

One embodiment of the present invention will hereinafter be described in detail.

Figure 3:
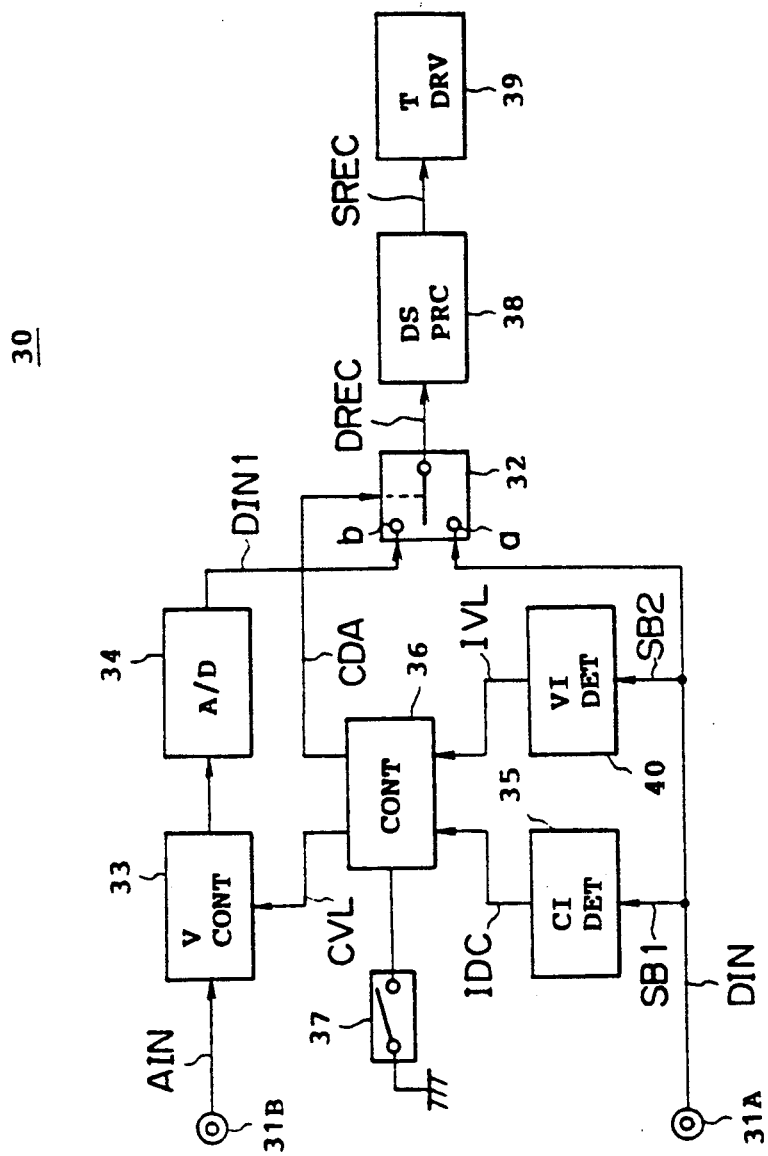
FIG. 3 is a block diagram of a digital signal recording apparatus according to this invention.

Designated generally at 30 in FIG. 3 is a digital audio tape recorder (DAT) as a digital signal recording apparatus having a digital input terminal 31A and an analog input terminal 31B to which digital and analog audio signals transmitted in common from a source of the audio signals are inputted.

An input digital audio signal DIN inputted via the digital input terminal 31A is supplied to a first input terminal a of a digital/analog selection circuit 32. An input analog audio signal AIN inputted via the analog input terminal 31B undergoes, after being volume-adjusted by a volume control circuit 33, an analog-to-digital conversion in an analog/digital converting circuit 34. A digital audio signal DIN1 obtained as a result of this is supplied to a second input terminal b of the digital/analog selection circuit 32.

Subcode information SB1 contained in the input digital audio signal DIN is inputted to a copy information detecting circuit 35. Digital copy authorized information IDC detected herein is inputted to a control unit 36.

This control unit 36 transmits a selection control signal CDA for switching over the digital/analog selection circuit 32 in accordance with the inputted digital copy authorized information IDC in such a state that an automatic selection switch 37 is turned ON by the user.

In the digital/analog selection circuit 32, the first input terminal a or the second input terminal b is selectable by the selection control signal CDA inputted from the control unit 36 as well as by the user's operation.

In the case of this embodiment, the control unit 36 generates the selection control signal CDA for selecting the first input terminal a of the digital/analog selection circuit 32 when a content of the digital copy authorized information IDC indicates that the digital copy is authorized over any generations or only one generation in the state where the automatic selection switch 37 is turned ON.

The input digital audio signal DIN is inputted as a sound recording digital audio signal DREC to a digital signal processing circuit 38 from the output terminal of the digital/analog selection circuit 32.

This digital signal processing circuit 38 effects predetermined digital signal processing on the sound recording audio signal DREC inputted. A sound recording digital signal SREC obtained as a consequence of this is inputted to a tape driving unit 39. The input digital audio signal DIN is thus digital-recorded on a magnetic tape.

The control unit 36 generates the selection control signal CDA for selecting the second input terminal b of the digital/analog selection circuit 32 in the case of turning ON the automatic selection switch 37 when the content of the digital copy authorized information IDC indicates an inhibition of the digital copy.

The digital audio signal DIN1 corresponding to the input analog audio signal AIN is inputted as the sound recording digital audio signal DREC to the digital signal processing circuit 38 from the output terminal of the digital/analog selection circuit 32. As in the same way as above, the input analog audio signal AIN is digital-recorded on the magnetic tape.

In the case of this embodiment herein, subcode information SB2 contained in the input digital audio signal DIN is inputted to a volume information detecting circuit 40. Digital volume information IVL detected herein is inputted as volume control information CVL via the control unit 36 to the volume control circuit 33.

Because of the digital copy being inhibited, even when the input analog audio signal AIN is digital-recorded on the magnetic tape, the volume of the input analog audio signal AIN can be controlled in accordance with the digital volume information IVL of the input digital audio signal DIN.

Thus, the volume when digital recording the input analog audio signal AIN is substantially equalized to the volume when digital-recording the input digital audio signal DIN. It is therefor possible to continuously effect digital-recording with almost no sense of incongruity even if an authorized signal portion of the digital copy as a source of the audio signal is mixed with an inhibited signal portion of the digital copy.

Figure 1:
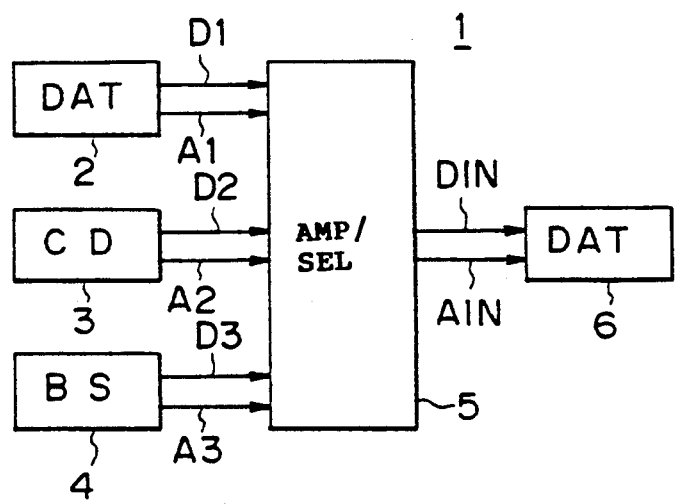
FIG. 1 is a block diagram of a conventional system for executing to recording/reproducing digital signals.

In the construction described above, for instance, if a DAT 10 is used in place of the digital signal recording apparatus (DAT) 6 of the DAT system 1 depicted in FIG. 1, and when recording the source of the audio signal known beforehand as a digital copy authorized signal by the user, a switchover to the first input terminal a may be effected, as in the same manner as the conventional one, by operating the digital/analog selection circuit 32 of the DAT 30.

With this arrangement, the DAT 30 is capable of digital-recording, on the magnetic tape, output digital audio signals D1, D2 and D3 transmitted from a reproduction DAT 2, a compact disc unit 3 and a satellite broadcasting transmitting/receiver 4.

Besides, when recording the source of the audio signal known beforehand as a digital copy inhibited terminal b is effected in the same way as the conventional one, by operating the digital/analog selection circuit 32.

With this arrangement, the DAT 30 is capable of digital-recording, on the magnetic tape, output analog audio signals A1, A2 and A3 transmitted from the digital signal reproducing apparatus DAT 2, the compact disc unit 3 and the satellite broadcasting transmitter/receiver 4.

Contrastingly, when recording the source of such audio signals that the digital copy authorized signal portion is mixed with the digital copy inhibited signal portion, the automatic selection switch 37 may be turned ON.

With this arrangement, the first input terminal a or second input terminal b of the digital/analog selection circuit 32 is automatically selected in accordance with a content of the digital copy authorized information IDC in the subcode SB1 of the input digital audio signal DIN.

Namely, when the content of the digital copy authorized information IDC indicates that the digital copy is authorized over any generations or only one generation, the first input terminal a of the digital/analog selection circuit 32 is automatically selected. Digital-recorded on the magnetic tape as a result of this are the output digital audio signals D1, D2 and D3 transmitted from the digital signal reproducing apparatus DAT 2, the compact disc unit 3 and the satellite broadcasting transmitter/receiver 4.

When the content of the digital copy authorized information IDC indicates the inhibition of the digital copy, the second input terminal b of the digital/analog selection circuit 32 is automatically selected. Digital-recorded on the magnetic tape as a consequence of this are the output analog audio signals A1, A2 and A3 transmitted from the reproduction DAT 2, the compact disc unit 3 and the satellite broadcasting transmitter/receiver 4.

The output digital audio signals D1, D2 and D3 or the output analog audio signals A1, A2 and A3 are selected in this manner. Even in the course of digital recording thereof, if the content of the digital copy authorized information IDC in the subcodes SB1 of the input digital audio signal DIN varies, the first input terminal a or the second input terminal b of the digital-/analog selection circuit 12 is automatically selected in accordance with the varied content of the digital copy authorized information IDC.

The first input terminal a or the second input terminal b of the digital/analog selection circuit 32 is thereby automatically switched over in accordance with the digital copy authorized or inhibited signal portion of the source of the audio signals. Sound recording can be performed without intermission invariably in an optimal state.

Hence, on the occasion of sound recording by use of the DAT 30, the automatic selection switch 37 may be always turned ON. With this operation, the user does not have to check beforehand whether or not the digital copy is authorized with respect to the source of the audio signals to be recorded and perform the troublesome operation depending on whether the digital copy is authorized or not. The usability of the apparatus can be thereby remarkably improved.

According to the construction discussed above, when the digital copy of the input digital audio signals is authorized based on the digital copy authorized information, the input digital audio signals to be inputted are recorded on the magnetic tape. When the digital copy is inhibited, the digital audio signals corresponding to the input analog audio signals to be inputted are recorded on the magnetic tape. It is therefore possible to attain the DAT 30 capable of performing sound recording invariably in the optimal sate without being aware of whether the digital copy is authorized or not. Thus, the usability of the apparatus can be improved outstandingly.

The embodiment discussed above has dealt with the case of employing the digital signal reproducing apparatus (DAT), the compact disc unit and the satellite broadcasting transmitter/receiver as sources of the audio signals. The present invention is not, however, limited to these devices. It can be actualized even by using other audio devices.

The embodiment discussed above has dealt with the case where the present invention is applied to the DAT. The present invention is not, however, limited to this but is suitable for wide applications to recording/reproducing devices constructed to perform digital recording and reproducing on and from a variety of recording mediums.

Subsequently, another embodiment of the present invention will hereinafter be described with reference to the drawings.

Figure 2:
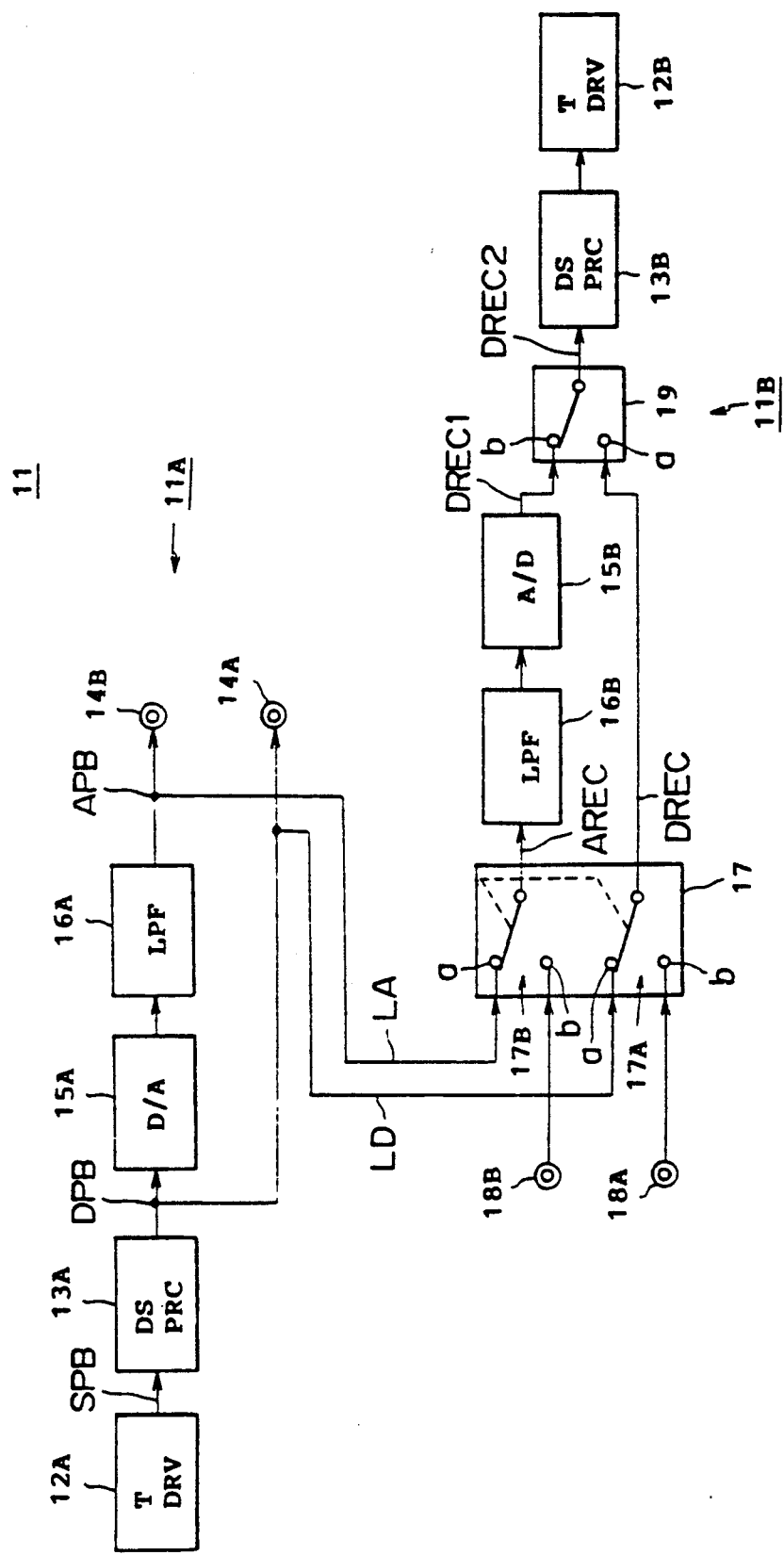
FIG. 2 is a block diagram of a supposable recording system for recording digital/analog signals selected.
Figure 4:
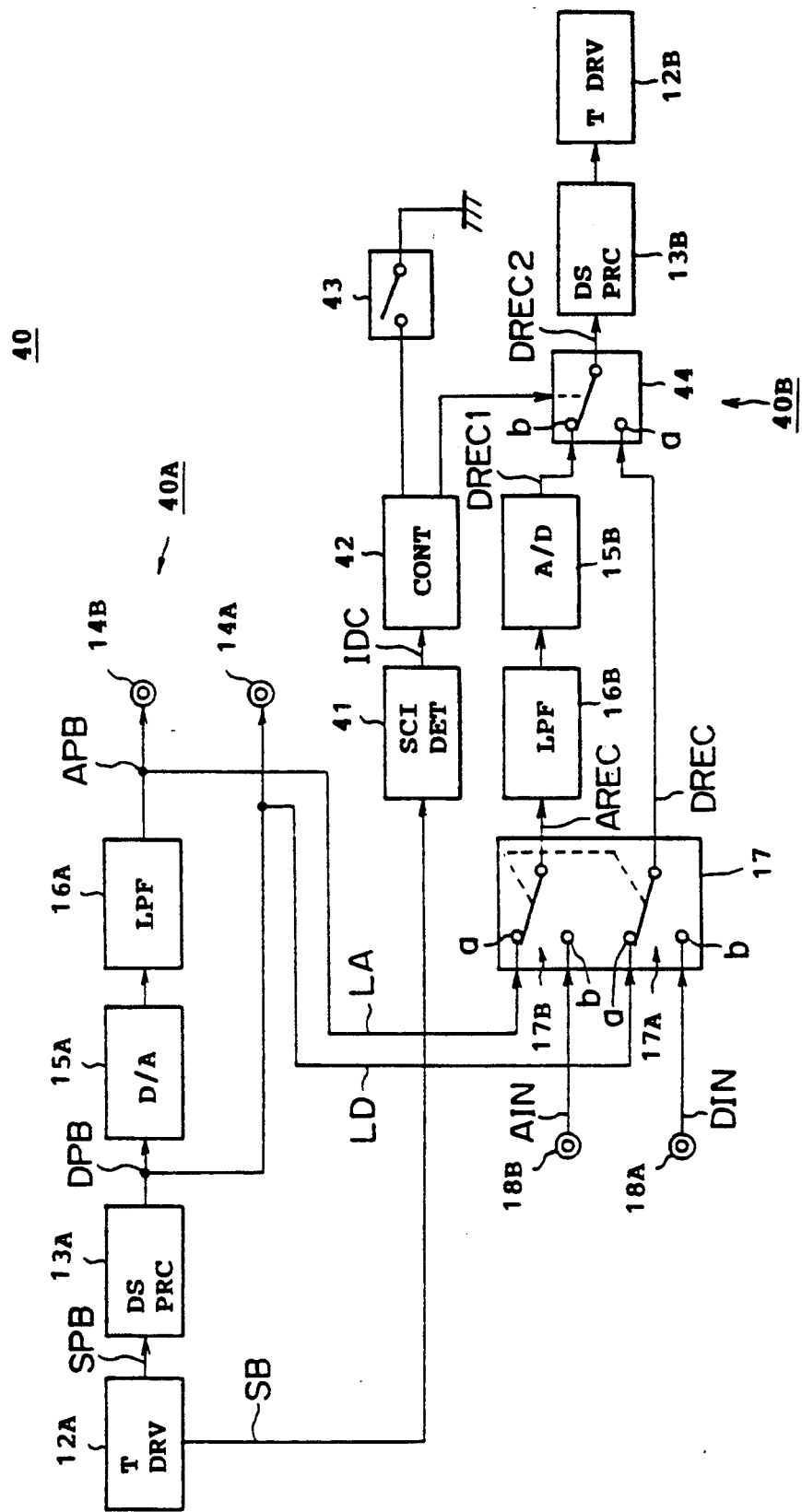
FIG. 4 is a block diagram of a signal dubbing apparatus according to this invention.

Referring to FIG. 4 in which portions corresponding to those of FIG. 2 are marked with the like reference numerals, the numeral 40 generally designates a double DAT deck according to the present invention. In addition to a regenerative signal SPB, subcodes SB on a magnetic tape are transmitted from a tape driving unit 12A having reproducing head and supplied to a subcode information detecting circuit 41.

The subcode information detecting circuit 41 detects 2-bit digital copy authorized information IDC contained the subcodes SB and transmit the information IDC to a control unit 42.

This control unit 42 transmits, upon a detection of the fact that an automatic selection switch 43 is turned ON by the user, a selection control signal CDA for switching over a digital/analog selection circuit 44 in accordance with the digital copy authorized information IDC.

This digital/analog selection circuit 44 is, as in the same way with the digital/analog selection circuit 19 of the conventional double DAT deck 1 (shown FIG. 2), capable of selecting a first input terminal a or a second input terminal b by an operation of the user. Besides, the circuit 44 is capable of selecting the first input terminal a or the second input terminal b in response to a selection signal CDA applied from the control unit 42.

In the case of this embodiment, the control unit 42 generates, when a content of the digital copy authorized information IDC indicates whether the digital copy is authorized over any generations or only one generation, a selection control signal CDA for selecting the first input terminal a of the digital/analog selection circuit 44 in such a state that the automatic selection switch 43 is turned ON. As a result of this, when performing dubbing, a digital audio signal path LD is specified.

The control unit 42 generates, when the content of the digital copy authorized information IDC indicates an inhibition of the digital copy, the selection control signal CDA for selecting the second input terminal b of the digital/analog selection circuit 44 in the state where the automatic selection switch 43 is turned ON. As a consequence of this, when performing dubbing, an analog audio signal path LA is specified.

Based on the construction discussed above, when the user performs dubbing of such a magnetic tape that the digital copy is, it is previously known, authorized by use of, e.g., this double DAT deck 40, a digital input switching circuit 17A and an analog input switching circuit 17B of a dubbing switching circuit 17 are, as in the same way with the prior art, switched over to the first input terminal a for example by manual operation. Simultaneously, the switchover to the first input terminal a may be effected by controlling the digital/analog selection circuit 44. And through the control unit by manual operation, a content reproduced by a digital signal reproducing system DAT 40A can be digital-recorded by a digital signal recording system DAT 40B via a digital audio signal path LD.

Moreover, when the user performs dubbing of such a magnetic tape that the digital copy is, it is known beforehand, inhibited, a changeover to the second input terminal b may be effected by, as in the same way with the prior art, controlling the digital/analog selection circuit 44. With this operation, the content reproduced by the digital signal reproducing system DAT 40A can be digital-recorded by the digital signal recording system DAT 40B via the analog audio signal path LA.

In contrast with this, in the case of dubbing the magnetic tape in which a digital copy authorized signal portion is mixed with a digital copy inhibited signal portion by use of the double DAT deck 40, the user switches over the digital input switching circuit 17A and the analog input switching circuit 17B of the dubbing switching circuit 17 to the first input terminal a, and at the same moment the automatic selection switch 43 may be turned ON.

With this operation, when the magnetic tape undergoes loading to the tape driving unit 12A of the digital signal reproducing system DAT 40A and reproducing the signal, the subcodes SB on the magnetic tape are read. In accordance with the content of the digital copy authorized information IDC in the subcodes SB, the first input terminal a or the second input terminal b of the digital/analog selection circuit 44 is automatically selected.

More specifically, when the content of the digital copy authorized information IDC indicates that the digital copy is authorized over any generations or only one generation, the first input terminal a of the digital/analog selection circuit 44 is automatically selected. As a result of this, the content reproduced by the digital signal reproducing system DAT 40A is digital-recorded by the digital signal recording system DAT 40B via the digital audio signal path LD.

Further, when the content of the digital copy authorized information IDC indicates the inhibition of the digital copy, the second input terminal b of the digital/analog selection circuit 44 is automatically selected. As a consequence of this, the content reproduced by the digital signal reproducing system DAT 40A is digital-recorded by the digital signal recording system DAT 40B via the analog audio signal path LA.

During even running of the magnetic tape after dubbing has been started by selecting the digital audio signal path LD or the analog audio signal path LA, if the content of the digital copy authorized information IDC in the subcodes SB on the magnetic tape varies, the first input terminal a or the second input terminal b of the digital/analog selection circuit 44 is automatically selected based on the varied content of the digital copy authorized information IDC.

Depending on the digital copy authorized or inhibited signal portion on the magnetic tape, the first input terminal a or the second input terminal b of the digital-/analog selection circuit 44 is automatically switched over. Dubbing can be therefore effected without intermission invariably via an optimal path.

Hence, on the occasion of dubbing by use of this double DAT deck 40, the digital input switching circuit 17A and the analog input switching circuit 17B of the dubbing switching circuit 17 may be always switched over to the first input terminal a, and the automatic selection switch 43 may be also turned ON.

With this operation, it is unnecessary for the user to previously check whether or not the digital copy is authorized with respect to the magnetic tape on which dubbing is effected and perform the troublesome operation depending on whether or not the digital copy is authorized. The usability by the user can be remarkably enhanced.

Based on the construction discussed above, when performing dubbing from the digital signal reproducing system DAT 40A to the digital signal recording system DAT 40B, the digital audio signal path LD or the analog audio signal path LA is automatically selected in accordance with the digital copy authorized information IDC obtained from the digital signal reproducing system DAT 40A and a designation of the user as well. It is therefore feasible to attain the double DAT deck 40A capable of dubbing invariably in the optimal state. The usability of the user can be thereby improved outstandingly.

Figure 5:
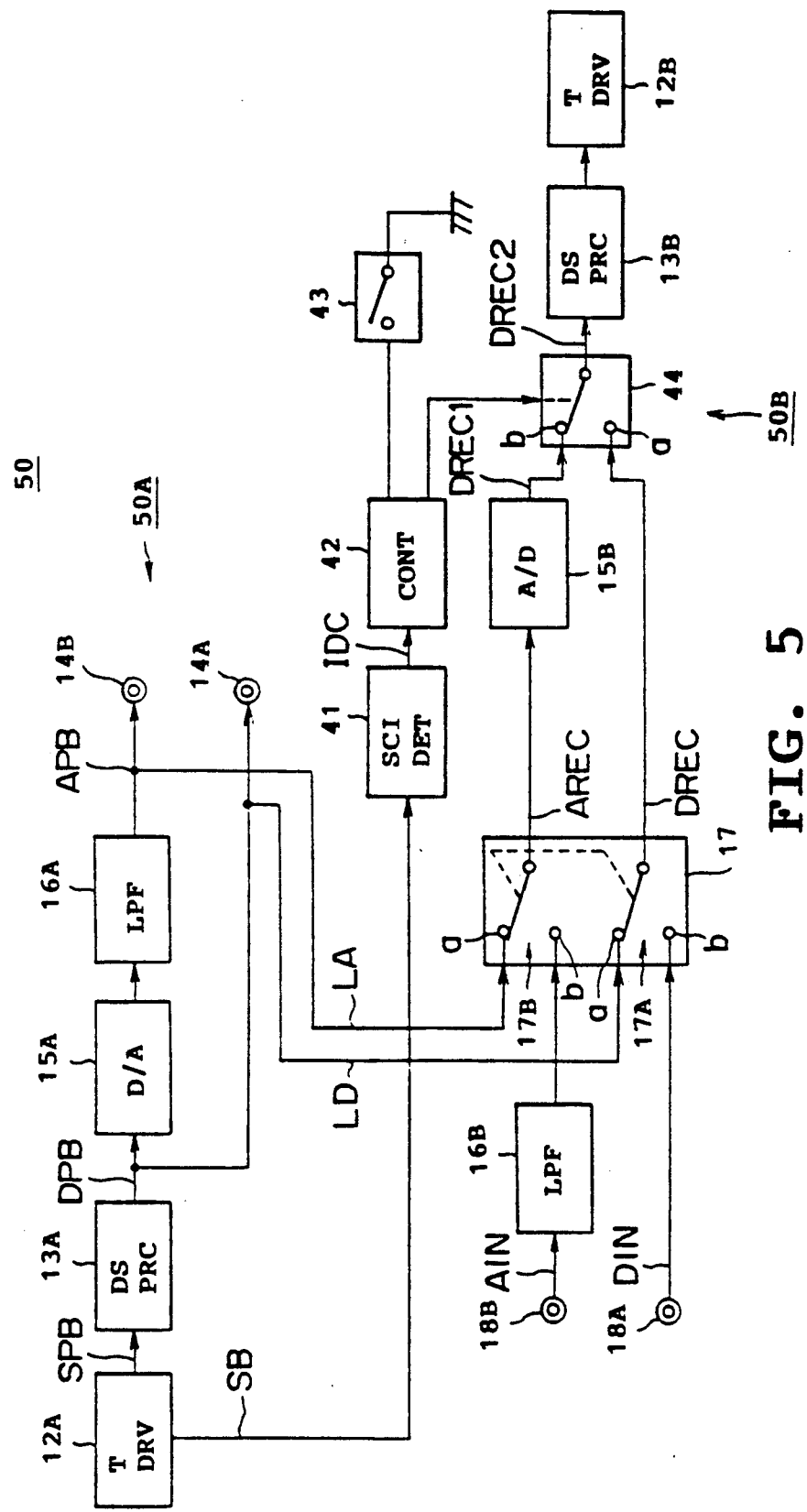
FIG. 5 is another block diagram of a signal dubbing apparatus according to this invention.

Referring to FIG. 5 in which the portion corresponding to those of FIG. 4 are marked with the like reference numerals, the numeral 50 generally denotes other double DAT deck according to the present invention. A low-pass filter 16B of the digital signal recording system DAT 50B is connected between an analog input terminal 18B and the second input terminal b of the analog input switching circuit 17B of the dubbing switching circuit 17.

When dubbing from the digital signal reproducing system DAT 50A to the digital signal recording system DAT 50B, and even if the analog audio signal path LA is selected, a regenerative analog audio signal APB passes through only the low-pass filter 16A of the digital signal reproducing system DAT 50A.

Hence, as illustrated in FIG. 4, a low-pass filter 16B is connected between the analog input switching circuit 17B of the dubbing switching circuit 17 and the analog/digital converting circuit 15B. As compared with a construction in which the regenerative analog audio signal APB passes through the two low-pass filters 16A, 16B during dubbing, an S/N ratio can be improved in proportion as the signal does not pass through unnecessary circuit elements. At the same time, it is possible to prevent a decline in sound quality by eliminating ripples in the filter passage area.

Based on the construction described above, when dubbing from the digital signal reproducing system DAT 50A to the digital signal recording system DAT 50B, the digital audio signal path LD or the analog audio signal path LA is automatically selected in accordance with the digital copy authorized information IDC obtained from the reproducing system DAT 50A and the designation of the user as well. It is therefore possible to attain the double DAT deck 50A capable of dubbing invariably in the optimal state. Moreover, according to the construction of this embodiment, even when the analog audio signal path is selected during dubbing, the regenerative analog audio signal APB passes through only the low-pass filter 16A of the digital signal reproducing system DAT 40A. It is therefore feasible to improve the S/N ratio and prevent a probable decline in the sound quality. Thus, it is possible to actualize the double DAT deck 50A capable of further improving the usability of the apparatus.

In the second embodiment shown in FIG. 5, the low-pass filter 16B of the digital signal recording system DAT 50B is connected between the analog input terminal 18B and the second input terminal b of the analog input switching circuit 17B of the dubbing circuit 17. The regenerative analog audio signal APB passes through only the low-pass filter 16A of the digital signal reproducing system DAT 50A even when selecting the analog audio signal path LA during dubbing. Instead of this arrangement, however, an output of the digital-/analog converting circuit 15A of the digital signal reproducing system DAT 40A may be inputted as a regenerative analog audio signal APB to the first input terminal a of the analog input switching circuit 17B of the dubbing circuit 17.

With this arrangement, even when the analog audio signal path LA is selected during dubbing, the regenerative analog audio signal APB is allowed to pass through only the low-pass filter 16B of the digital signal recording system DAT 40B. The same effects as those of the second embodiment can be thus acquired.

The embodiment discussed above has dealt with the double DAT deck in which the digital signal reproducing system DAT is combined with the digital signal recording system DAT. The present invention is not limited to this arrangement. The same effects as those of the above-mentioned embodiment can be actualized even by combining two DATs each capable of recording and reproducing.

The embodiment discussed above has dealt with the double DAT deck in which the two DATs are combined. The present invention is not limited to this arrangement but is suitable for wide applications to a recording/reproducing device constructed to effect the transcriptional record by combining two recording/reproducing units which perform digital recording/reproducing on and from the same record medium.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the spirit and scope of the invention.

what is claimed is:

1. A digital signal recording apparatus comprising:
   means for receiving analog signals;
   means for receiving digital signals;
   means for converting said analog signals into converted digital signals;
   signal selection means for selecting said received digital signals or said converted digital signals;
   means for extracting from said received digital signals a signal indicating the volume level of said received digital signals;

volume level adjustment means receiving, from said means for extracting, said signal indicating the volume level of said received digital signals;

volume level control means responsive to said volume level adjustment means for controlling the volume level of said analog signals; and digital signal recording means for recording digital signals outputted from said signal selection means on a signal recording medium;

wherein said digital signal recording apparatus further comprises:

means for detecting a signal for specifying whether or not the recording of said received digital signals is authorized; and means for generating a changeover control signal for controlling said signal selection means to select said received digital signals for recording if the recording of said received digital signals is authorized.

2. The digital signal recording apparatus according to claim 1 wherein the volume controlling is executed on said analog signal as supplied to said analog/digital conversion means.

3. The digital signal recording apparatus according to claim 1 further comprising:

operating means for enable/disenable control of the supplying of said changeover control signal to said signal selection means.

4. A method for recording digital signals, comprising the steps of:

receiving analog signals;

receiving digital signals;

converting said analog signals into converted digital signals;

selecting said received digital signals or said converted digital signals;

extracting from said received digital signals a signal indicating the volume level of said received digital signals;

receiving said signal indicating the volume level of said received digital signals;

controlling the volume level of said analog signals in response to said received signal indicating the volume level of said received digital signals; and recording the selected digital signals on a signal recording medium;

wherein said method further comprises the steps of:

detecting a signal for specifying whether or not the recording of said received digital signals is authorized; and generating a changeover control signal ensuring the selection of said received digital signals if the recording of said received digital signals is authorized.

* * * * *